US012561165B2

(12) United States Patent
    Raghavendran

(10) Patent No.: US 12,561,165 B2
(45) Date of Patent: Feb. 24, 2026

(54) SYSTEM AND METHOD FOR PERFORMING ZONAL SCALING OPERATIONS

(71) Applicant: Visa International Service Association, San Francisco, CA (US)

(72) Inventor: Varadharajan Raghavendran, Perundurai (IN)

(73) Assignee: Visa International Service Association, San Francisco, CA (US)

( * ) Notice: Subject to any disclaimer, the term of this patent is extended or adjusted under 35 U.S.C. 154(b) by 803 days.

(21) Appl. No.: 17/878,823

(22) Filed: Aug. 1, 2022

(65) Prior Publication Data

US 2024/0036914 A1     Feb. 1, 2024

(51) Int. Cl.
    *G06F 9/48*        (2006.01)
    *G06F 9/50*        (2006.01)
    *G06F 16/901*      (2019.01)

(52) U.S. Cl.
    CPC .......... *G06F 9/4881* (2013.01); *G06F 9/5055* (2013.01); *G06F 16/9024* (2019.01)

(58) Field of Classification Search
    None
    See application file for complete search history.

(56)             References Cited

U.S. PATENT DOCUMENTS

| | | | | | |
|---|---|---|---|---|---|
| 7,650,376 | B1 * | 1/2010 | Blumenau | ........... | H04L 67/1008 709/217 |
| 8,650,299 | B1 * | 2/2014 | Huang | ................ | H04L 67/1001 709/226 |

| | | | | | |
|---|---|---|---|---|---|
| 9,448,824 | B1 * | 9/2016 | Fitzgerald | ........... | G06F 9/45533 |
| 9,471,349 | B1 * | 10/2016 | Stone | .................... | G06F 9/5061 |
| 10,191,778 | B1 | 1/2019 | Yang et al. | | |
| 10,505,863 | B1 * | 12/2019 | Florissi | .................. | H04L 67/12 |
| 10,708,082 | B1 | 7/2020 | Bakiaraj et al. | | |
| 10,728,135 | B2 | 7/2020 | Raney | | |
| 11,194,638 | B1 * | 12/2021 | Danilov | ............... | G06F 9/5083 |
| 2008/0301147 | A1 * | 12/2008 | Yellapragada | .......... | H04L 41/12 |

(Continued)

FOREIGN PATENT DOCUMENTS

CN          113835897 A      12/2021

OTHER PUBLICATIONS

Y. Han, S. Shen, X. Wang, S. Wang and V. C. M. Leung, "Tailored Learning-Based Scheduling for Kubernetes- Oriented Edge-Cloud System," IEEE INFOCOM 2021—IEEE Conference on Computer Communications, 2021, pp. 1-10.

(Continued)

*Primary Examiner* — Adam Lee
(74) *Attorney, Agent, or Firm* — Buckley Patent Law LLC; Timothy Emmanuel Buckley

(57)             ABSTRACT

In some embodiments, a method includes receiving zonal topology information related to a zonal topology of a plurality of zones; utilizing the zonal topology information to perform a level strength assessment of each level of a plurality of levels associated with the zonal topology of the plurality of zones; and based on the level strength assessment of each level of the plurality of levels, scaling a target number of resources to at least a first level of the plurality of levels of the zonal topology. In some embodiments of the method, the level strength assessment includes performing a level-by-level breadth analysis of each level of the plurality of levels of the zonal topology.

20 Claims, 6 Drawing Sheets

(56)  References Cited

U.S. PATENT DOCUMENTS

| | | | |
|---|---|---|---|
| 2015/0363126 A1* | 12/2015 | Frick | G06F 3/0634 |
| | | | 711/114 |
| 2017/0041296 A1* | 2/2017 | Ford | G06F 21/64 |
| 2018/0176148 A1* | 6/2018 | Ku | G06Q 30/0283 |
| 2018/0198852 A1* | 7/2018 | Agrawal | H04L 67/1001 |
| 2018/0359162 A1* | 12/2018 | Savov | H04L 41/0897 |
| 2019/0220298 A1* | 7/2019 | Jiao | G06F 9/5077 |
| 2020/0272526 A1* | 8/2020 | Bhole | G06F 11/3409 |
| 2020/0351373 A1 | 11/2020 | Gupta et al. | |
| 2021/0058327 A1 | 2/2021 | Mariappan et al. | |
| 2021/0173719 A1* | 6/2021 | Chester | G06F 9/455 |
| 2021/0240517 A1* | 8/2021 | Mohapatra | G06F 9/445 |
| 2022/0147401 A1* | 5/2022 | Wigglesworth | G06F 9/5083 |
| 2022/0351133 A1* | 11/2022 | Akiona | G06Q 10/087 |
| 2023/0008011 A1* | 1/2023 | Nair | H04L 47/726 |
| 2023/0107518 A1* | 4/2023 | Parmar | G06F 11/1484 |
| | | | 714/48 |
| 2023/0305901 A1* | 9/2023 | Vinson | G06F 9/4893 |
| 2024/0012674 A1* | 1/2024 | Xie | G06F 9/5077 |

OTHER PUBLICATIONS

Zheng N, Chen Q, Yang Y, Zhang W, Li J, Zheng W, Guo M., "URSA: Precise Capacity Planning and Contention-aware Scheduling for Public Clouds", Dec. 2, 20197, arXiv preprint arXiv:1912.11963.

Kubernetes, "Kubernetes Scheduler", May 10, 2022, https://kubernetes.io/docs/concepts/scheduling-eviction/kube-scheduler/, Kubernetes.

Wei H, et. al., "EvenPodsSpread discussion on tainted nodes", https://github.com/kubernetes/kubernetes/issues/80921, Aug. 2, 2019, Issue No. 80921, Github.

* cited by examiner

SYSTEM AND METHOD FOR PERFORMING ZONAL SCALING OPERATIONS

BACKGROUND

The background description provided herein is for the purpose of generally presenting the context of the disclosure. Work of the presently named inventor(s), to the extent it is described in this background section, as well as aspects of the description that may not otherwise qualify as prior art at the time of filing, are neither expressly nor impliedly admitted as prior art against the present disclosure.

Application developers have been assigned the task of deploying software applications onto a variety of databases located throughout the world. Container orchestration engines, such as, for example, Kubernetes®, have gained popularity as a way of utilizing "containers" to deploy the software applications onto the databases. The containers are grouped into "pods" that are used to deploy the software applications. The pods, which are distributed across nodes utilizing Kubernetes®, must be scheduled efficiently to ensure applications may be accessed reliably. Therefore, a need exists for a scheduler that ensures high availability across multiple zones and databases.

DETAILED DESCRIPTION

Figure 1:
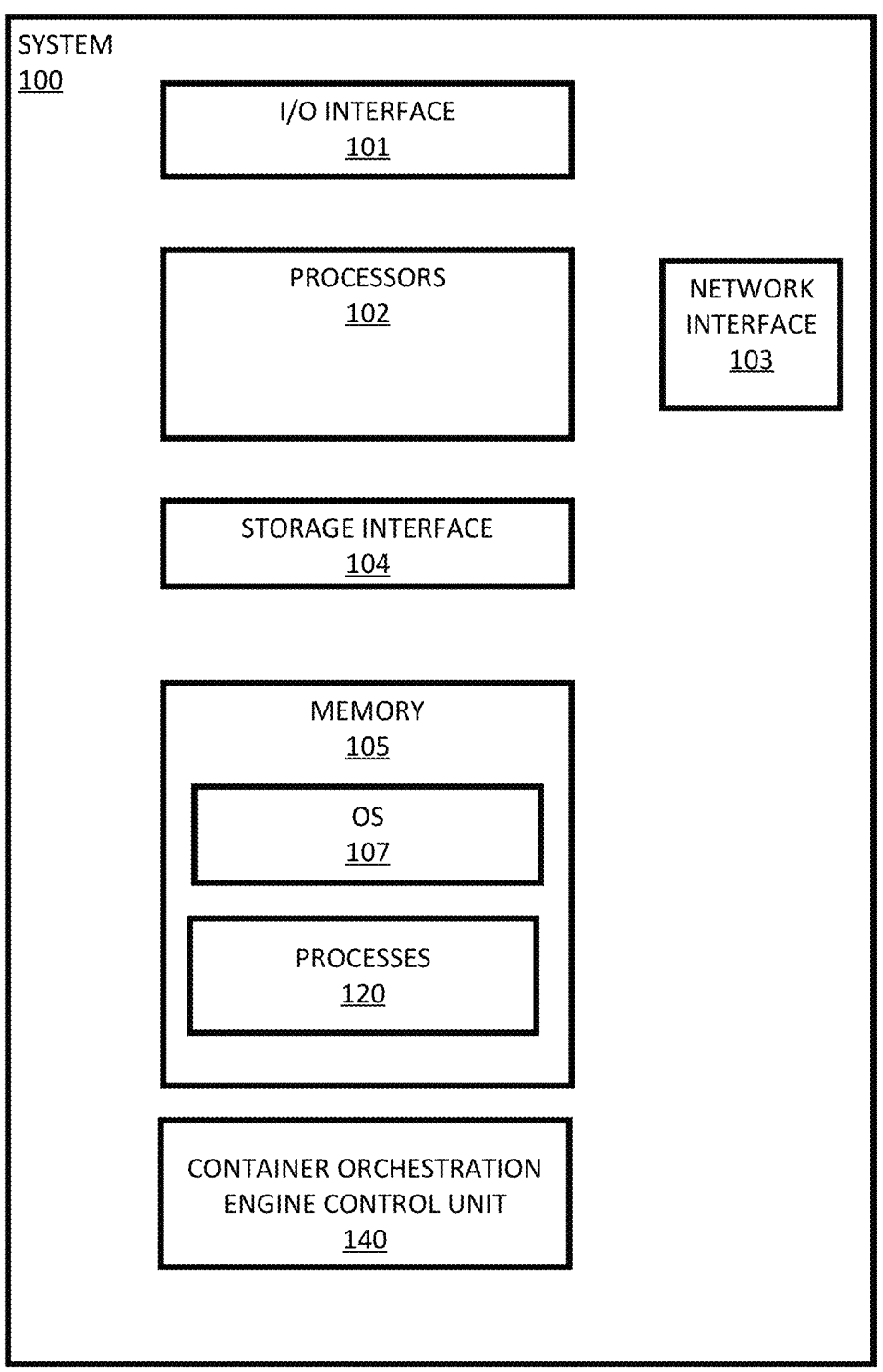
FIG. 1 illustrates a block diagram of a system in accordance with some embodiments.

FIG. 1 illustrates a block diagram of an exemplary system 100 for implementing embodiments consistent with the present disclosure. In some nonlimiting embodiments or aspects, the system 100 implements a container orchestration engine that utilizes a zonal scheduling unit in a scheduler of container orchestration engine control unit 140 to implement level-strength-based scheduling of resources (e.g., pods or replicas of pods) in various zones distributed across a zonal topology as described further herein. In some embodiments, the container orchestration engine may be, for example, a Kubernetes® container orchestration engine or some other type of container orchestration engine used to automate software deployment, scaling, and container management.

In some embodiments, the system 100 may be a computer device, server, mobile device, a tablet, or some other type of computer system capable of performing the operations described herein. In some embodiments, the processors 102 may comprise at least one data processor for executing program components for dynamic resource allocation at run time. The processors 102 may include specialized processing units such as integrated system (bus) controllers, memory management control units, floating point units, graphics processing units, digital signal processing units, etc.

In some embodiments, the processors 102 may be disposed in communication with one or more input/output (I/O) devices (not shown) via an I/O interface 101. The I/O interface 101 may employ communication protocols/methods such as, without limitation, audio, analog, digital, mono-aural, RCA, stereo, IEEE-1394, serial bus, universal serial bus (USB), infrared, PS/2, BNC, coaxial, component, composite, digital visual interface (DVI), high-definition multimedia interface (HDMi), RF antennas, S-Video, VGA, IEEE 802.1 n/b/g/n/x, Bluetooth®, cellular (e.g., code-division multiple access (CDMA), high-speed packet access (HSPA+), global system for mobile communications (GSM), long-term evolution (LTE), WiMax®, or the like), etc.

In some embodiments, using the I/O interface 101, the system 100 may communicate with one or more I/O devices. For example, an input device may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. An output device may be a printer, fax machine, video display (e.g., cathode ray tube (CRT), liquid crystal display (LCD), light-emitting diode (LED), plasma, Plasma display panel (PDP), Organic light-emitting diode display (OLED) or the like), audio speaker, etc.

In some embodiments, the processors 102 may be disposed in communication with a communication network via a network interface 103. The network interface 103 may communicate with the communication network. The network interface 103 may employ connection protocols including, without limitation, direct connect, Ethernet (e.g., twisted pair 10/300/3000 Base T), transmission control protocol/Internet protocol (TCP/IP), token ring, IEEE 802.11a/b/g/n/x, etc. The communication network may include, without limitation, a direct interconnection, e-commerce network, a peer to peer (P2P) network, local area network (LAN), wide area network (WAN), wireless network (e.g., using Wireless Application Protocol), the internet, Wi-Fi®, etc. Using the network interface 103 and the communication network 109, the system 100 may communicate with the one or more service operators.

In some non-limiting embodiments or aspects, the processors 102 may be disposed in communication with a memory 105 (e.g., RAM, ROM, etc.) via a storage interface 104. In some embodiments, the storage interface 104 may connect to memory 105 including, without limitation, memory drives, removable disc drives, etc., employing connection protocols such as serial advanced technology attachment (SATA), Integrated Drive Electronics (IDE), IEEE-1394, Universal Serial Bus (USB), fiber channel, Small Computer Systems interface (SCSI), etc. The memory drives may further include a drum, magnetic disc drive, magneto-optical drive, optical drive, Redundant Array of Independent Discs (RAID), solid-state memory devices, solid-state drives, etc.

In some embodiments, the memory 105 may store a collection of program or database components, including, without limitation, a user interface, an operating system (e.g., operating system 107), processes (e.g., processes 120), a web server, etc. In some non-limiting embodiments or aspects, the system 100 may store user/application data, such as the data, variables, records, etc. Such databases may be implemented as fault-tolerant, relational, scalable, secure databases such as Oracle or Sybase.

In some embodiments, the operating system 107 may facilitate resource management and operation of the system 100. Examples of operating systems include, without limitation, APPLE® MACINTOSH® OS X®, UNIX®, UNIX-like system distributions (E.G., BERKELEY SOFTWARE DISTRIBUTION® (BSD), FREEBSD®, NETBSD®, OPENBSD, etc.), LINUX® DISTRIBUTIONS (E.G., RED HAT®, UBUNTU®, KUBUNTU®, etc.), IBM® OS/2®, MICROSOFT® WINDOWS® (XP®, VISTA®/7/8, 10 etc.), APPLE® OS®, GOOGLE™ ANDROID™, BLACKBERRY® OS, or the like.

In some non-limiting embodiments or aspects, the system 100 may implement a web browser (not shown in the figures) stored program component. The web browser (not shown in the figures) may be a hypertext viewing application, such as MICROSOFT® INTERNET EXPLORER®, GOOGLE™ CHROME™, MOZILLA® FIREFOX®, APPLE® SAFARI®, etc. Secure web browsing may be provided using Secure Hypertext Transport Protocol (HTTPS), Secure Sockets Layer (SSL), Transport Layer Security (TLS), etc. Web browsers may utilize facilities such as AJAX, DHTML, ADOBE® FLASH®, JAVASCRIPT®, JAVA®, Application Programming Interfaces (APIs), etc.

In some non-limiting embodiments or aspects, the system 100 may implement a container orchestration engine, such as, for example, a Kubernetes® container orchestration engine, or some other type of container orchestration engine (e.g., Docker Swarm, Amazon Elastic Container Service, Nomad, or the like). In some embodiments, the container orchestration engine is executable code configured to automate software deployment, scaling, and container management using the level-strength-based scheduling techniques described herein. In some embodiments, the container orchestration engine may implement a container orchestration engine control unit 140. In some embodiments, in addition to defining, deploying, and managing lifecycles of containers utilized by the container orchestration engine, the container orchestration engine control unit 140 is configured to implement a level-strength-based scheduling technique to schedule and bind resources (e.g., pods or replicas of pods) to suitable nodes in a cluster, further described herein.

Furthermore, one or more computer-readable storage media may be utilized in implementing embodiments consistent with the present disclosure. In some embodiments, a computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, e.g., non-transitory. Examples include Random Access Memory (RAM), Read-Only Memory (ROM), volatile memory, non-volatile memory, hard drives, Compact Disc (CD) ROMs, Digital Video Disc (DVDs), flash drives, disks, and any other known physical storage media.

Figure 2:
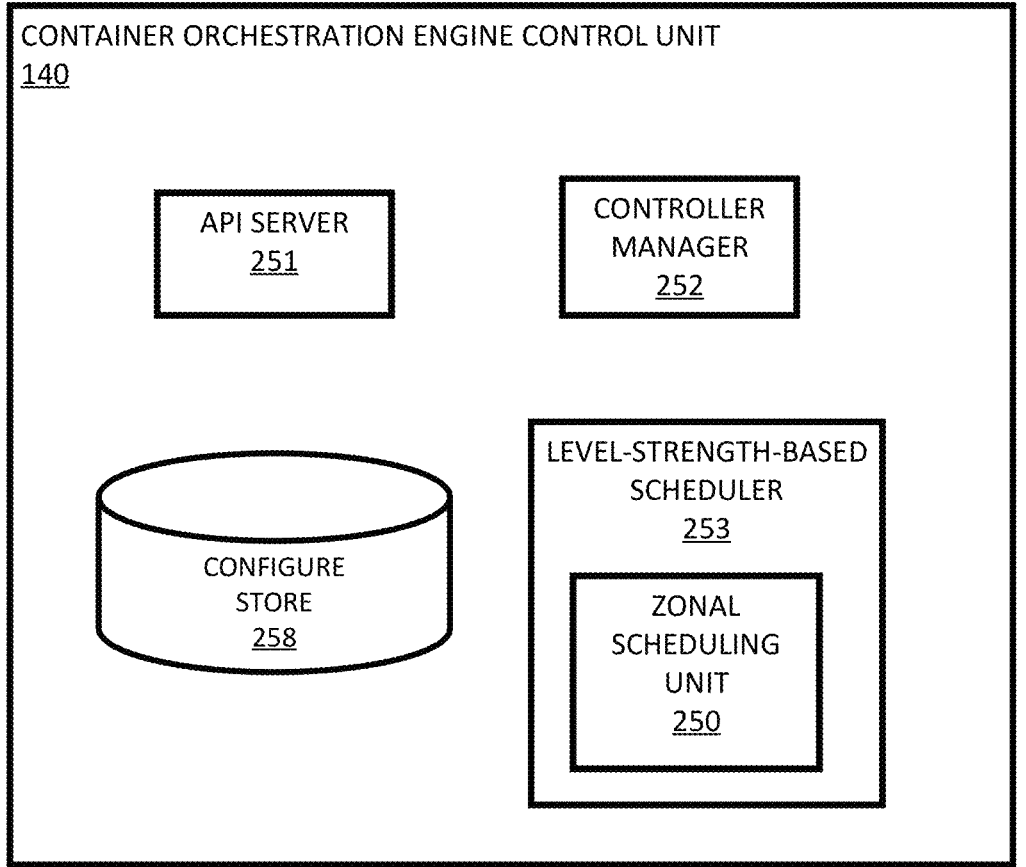
FIG. 2 illustrates a container orchestration engine control unit of the system of FIG. 1 in accordance with some embodiments.

FIG. 2 illustrates a block diagram of a container orchestration engine control unit 140 for implementing embodiments consistent with the present disclosure. In some embodiments, the container orchestration engine control unit 140 is executable code configured to be implemented by a container orchestration engine, such as, for example, a Kubernetes® container orchestration engine, or some other type of container orchestration engine (e.g., Docker Swarm, Amazon Elastic Container Service, Nomad, or the like). In some embodiments, the container orchestration engine is executable code configured to automate software deployment, scaling, and container management using the level-strength-based scheduling techniques described herein. In some embodiments, the container orchestration engine control unit 140, in addition to defining, deploying, and managing lifecycles of containers utilized by the container orchestration engine, is code executable by processors 102 that is configured to implement a level-strength-based scheduling technique to schedule and bind resources (e.g., pods or replicas of pods) to suitable nodes in a cluster. In some embodiments, the container orchestration engine control unit 140, may be, for example, a Kubernetes® master that has been configured to utilize a level-strength-based scheduler 253 to schedule pods in nodes located across a plurality of zones using the zonal scheduling unit 250 described further herein.

In some embodiments, the container orchestration engine control unit 140 includes an application programming interface (API) server 251, a controller manager 252, a configure store 258, and a level-strength-based scheduler 253. In some embodiments, the API server 251 is code executable by processors 102 of FIG. 1 that is configured to serve as a front-end of the container orchestration engine control unit 140 that exposes a container orchestration engine API. In some embodiments, the container orchestration engine API allows a user of container orchestration engine control unit 140 to query and manipulate the state of API objects (e.g., pods of containers) in the container orchestration engine. In some embodiments, API server 251 is configured to authenticate and authorize requests made by a user of the system 100 to allow the user to utilize the zonal scheduling unit 250 of level-strength-based scheduler 253 to schedule resources (e.g., pods or replicas of pods) in the nodes of the server zones (illustrated by way of example in FIG. 5A-FIG. 5C).

In some embodiments, the controller manager 252 is code executable by processors 102 configured to run controller processes. The controller manager 252 embeds control loops that monitor a state of a cluster through the API server 251 and makes changes attempting to move a current state to a desired state. In some embodiments, the controllers may include, for example, a node controller, a job controller, an endpoints controller, and a service account and token controller. In some embodiments, with reference to the Kubernetes® container orchestration engine, controller manager 252 may be a Kubernetes® controller manager for a Kubernetes® cluster, where a cluster includes a set of worker machines (e.g., nodes) that run containerized applications.

In some embodiments, the configure store 258 is a key value store that is used as a backing store for cluster data in the container orchestration engine. In some embodiments, each cluster utilized by the container orchestration engine includes at least a single node. In some embodiments, each node includes pods that are utilized by zonal scheduling unit 250 to schedule the upscaling or downscaling of pods to the nodes that are located across multiple zones.

Figure 3:
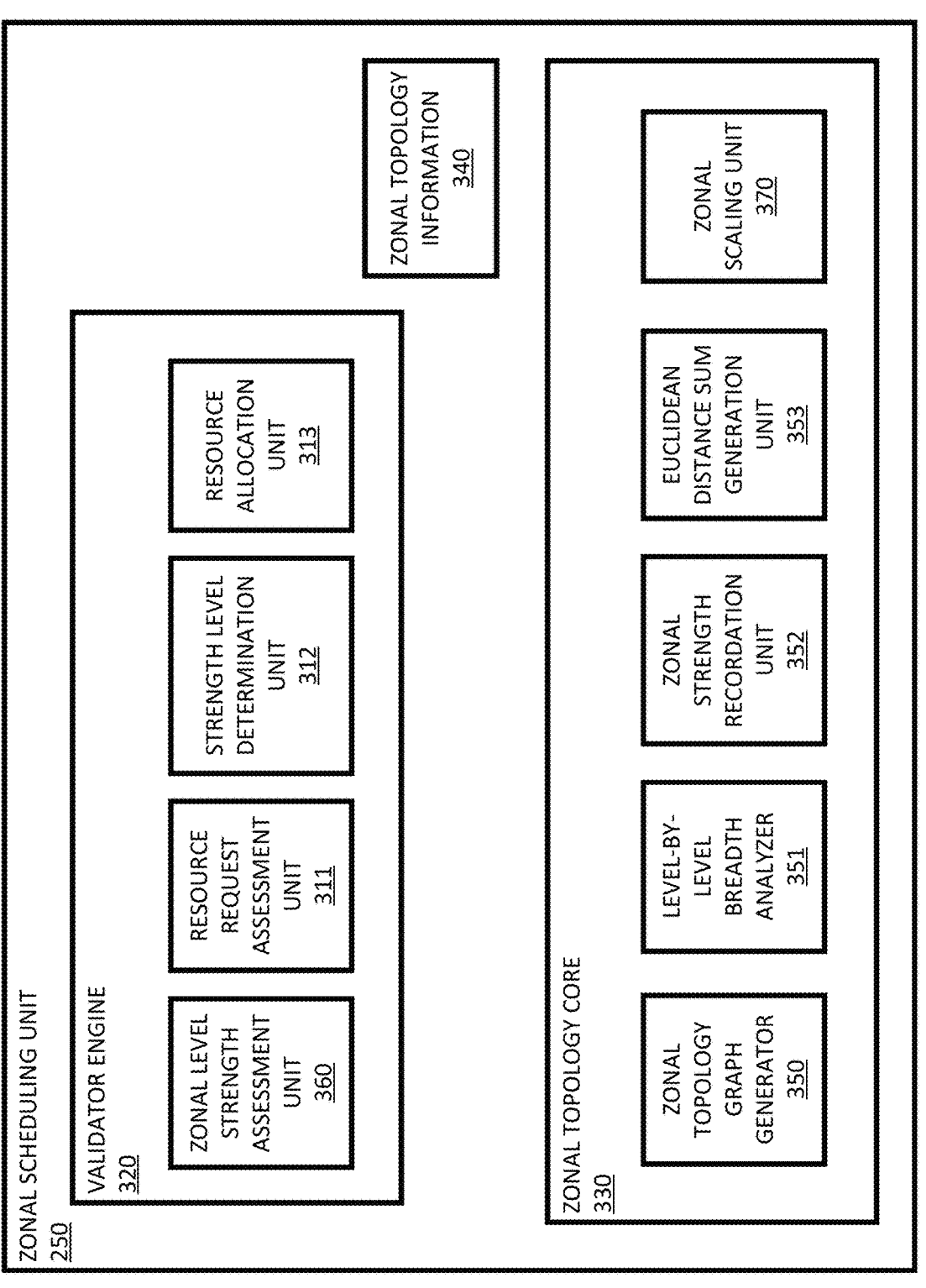
FIG. 3 illustrates a zonal scheduling unit in accordance with some embodiments.
Figure 4:
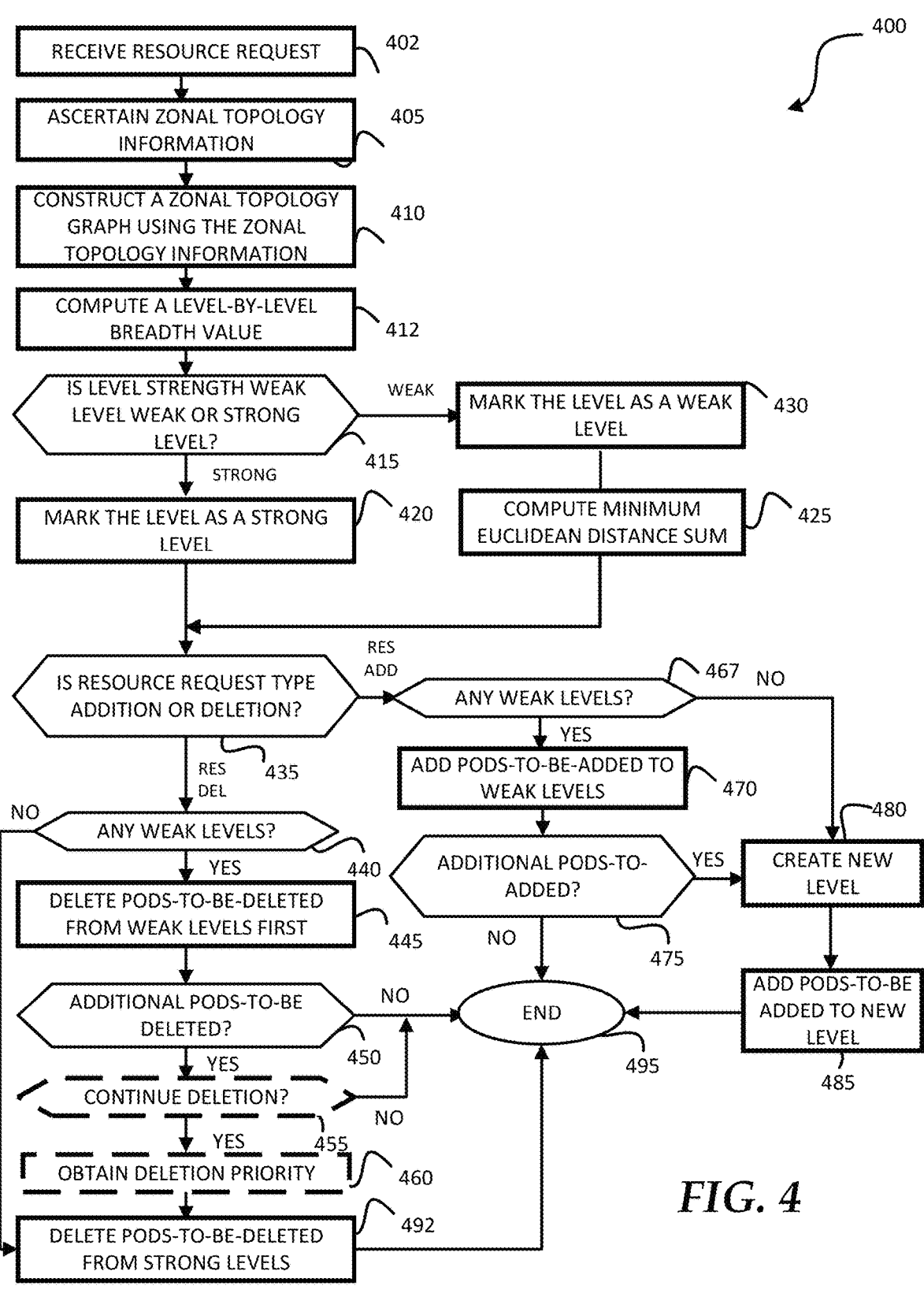
FIG. 4 is a flow diagram illustrating a method of performing level-strength-based scheduling in accordance with some embodiments.

In some embodiments, the level-strength-based scheduler 253 is executable code that is configured to utilize zonal scheduling unit 250 to schedule pods or other containerized resources in server zones using level-strength-based scheduling techniques illustrated in FIG. 4. In some embodiments, the level-strength-based scheduler 253 may be utilized as a custom scheduler plugin that may be compiled into a scheduling framework of the container orchestration engine, such as, for example, a Kubernetes® pluggable scheduler framework. The level-strength-based scheduling techniques are described further below with reference to FIG. 3-FIG. 5C.

Figures 5A, 5B:
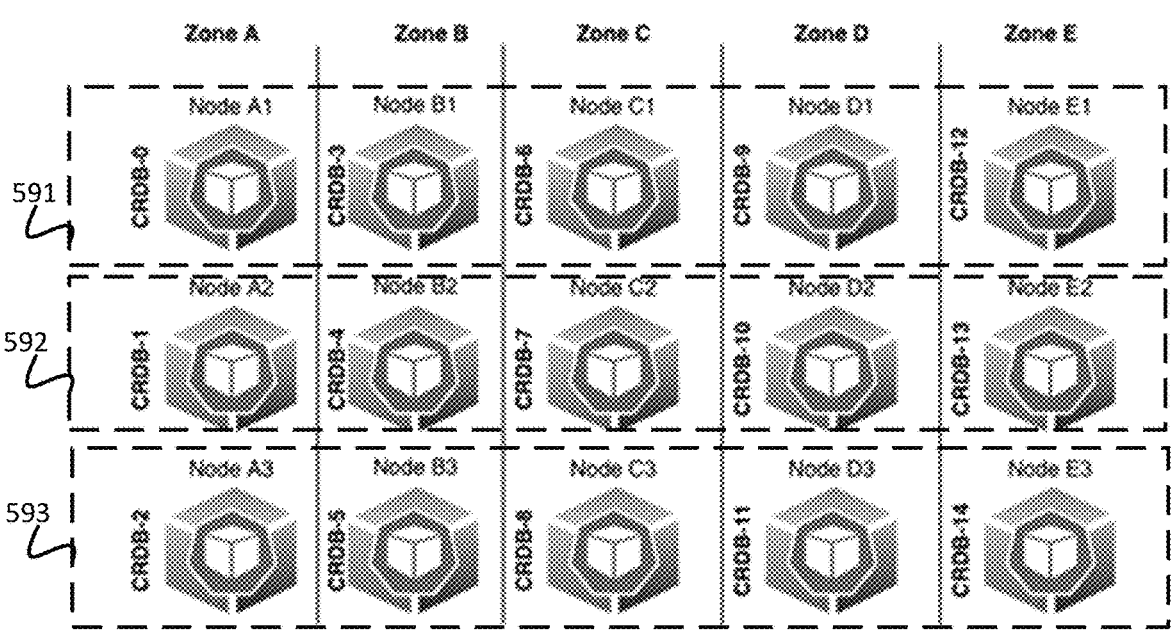
FIG. 5A illustrates a zonal topology in accordance with some embodiments.
FIG. 5B illustrates an example of utilizing the level-strength-based scheduling of FIG. 4 for the zonal topology of FIG. 5A in accordance with some embodiments.
Figure 5C:
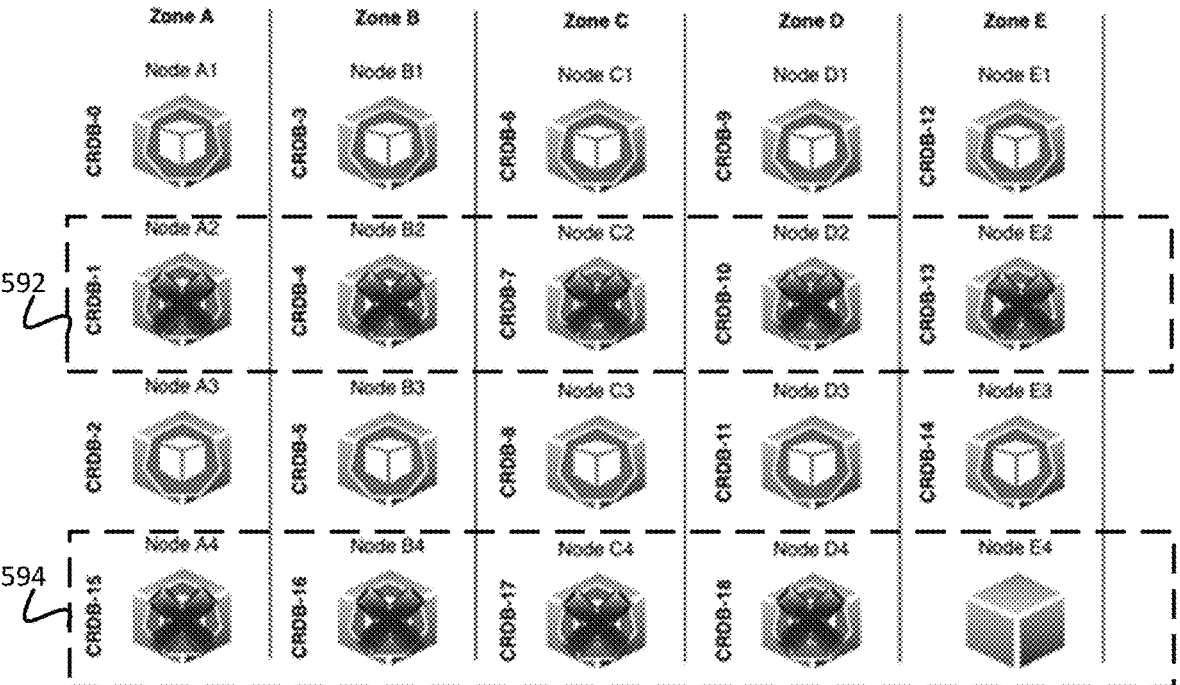
FIG. 5C illustrates an example of utilizing the level-strength-based scheduling of FIG. 4 for the zonal topology of FIG. 5B in accordance with some embodiments.

FIG. 3 illustrates the zonal scheduling unit 250 of FIG. 2 in accordance with some embodiments. In some embodiments, the zonal scheduling unit 250 is executable code configured to utilize a zonal topology core 330 and a validator engine 320 to perform the level-strength-based scheduling described herein. In some embodiments, the zonal topology core 330 includes a zonal topology graph generator 350, level-by-level breadth analyzer 351, a zonal strength recordation unit 352, a Euclidean distance sum generation unit 353, and a zonal scaling unit 370 that are collectively configured to perform the zonal topology core operations of the level-strength-based scheduling method 400 exemplified in FIG. 4. In some embodiments, the zonal topology graph generator 350 is executable code configured to generate a zonal topology graph utilizing zonal topology information 340 related to the zonal topology of zones used for level-strength-based scheduling by the container orchestration engine. In some embodiments, the zonal topology graph is a topological graph that reflects an exact zonal topology presented in a cluster that represents nodes in zones that run containerized applications. In some embodiments, the zonal topology graph may be, for example, an unweighted acyclic graph that represents multiple clusters across multiple zones at various server locations, where each cluster may include multiple nodes at each server location or zone. Examples of zonal topologies used by zonal topology graph generator 350 to generate zonal topology graphs are illustrated in FIG. 5A-FIG. 5C.

In some embodiments, the level-by-level breadth analyzer 351 is executable code configured to perform a level-by-level breadth analysis of the zonal topology graph generated by the zonal topology graph generator 350. In some embodiments, the output of the level-by-level breadth analysis is a level-by-level breadth value that is used to determine the strength of each level of the zonal topology. In some embodiments, the level-by-level breadth value generated by the level-by-level breadth analyzer 351 is compared to a breadth strength threshold to ascertain whether a level is a "strong" level or a "weak" level for use in the level-strength-based scheduling described further below with reference to FIG. 4.

In some embodiments, the zonal strength recordation unit 352 is executable code configured to mark an identified level of a zonal topology as either a weak level or a strong level. In some embodiments, zonal strength recordation unit 352 is configured to record the mark in, for example, memory 105. In some embodiments, Euclidean distance sum generation unit 353 is executable code configured to compute a minimum Euclidean distance that is used during the level-strength-based scheduling method described further below with reference to FIG. 4. In some embodiments, zonal scaling unit 370 is executable code configured to perform scaling operations based upon zonal topology strength level assessments generated by validator engine 320.

In some embodiments, the validator engine 320 includes a zonal level strength assessment unit 360, a resource request assessment unit 311, a strength level determination unit 312, and a resource allocation unit 313. In some embodiments, the zonal level strength assessment unit 360 is executable code configured to measure a strength of each level in the zonal topology graph generated by zonal topology graph generator 350. In some embodiments, the resource request assessment unit 311 is executable code configured to determine the type of resource request requested by the user of the level-strength-based scheduler 253. In some embodiments, the strength level determination unit 312 is executable code configured to determine whether there are any weak levels or strong levels in the zonal topology graph that were identified by the zonal level strength assessment unit 360. In some embodiments, the resource allocation unit 313 is executable code configured to determine whether additional resources (such as, for example, additional pods or replicas of pods) remain to be added or deleted after a level has been exhausted (e.g., a level is no longer available for adding resources and there are still resources to be added or all resources in a level have been deleted and there are additional resources to be deleted). In some embodiments, the operations performed by the validator engine 320 and zonal topology core 330 to schedule resources (e.g., pods or replicas of pods) utilizing the level-strength-based scheduling techniques are further described with reference to FIG. 4.

FIG. 4 illustrates a level-strength-based scheduling method 400 of performing level-strength-based scheduling in accordance with some embodiments. In some embodiments, the level-strength-based scheduling method 400 illustrated in FIG. 4 is a method for scheduling resources (e.g., pods or replicas of pods) across multiple zones based upon the strengths of each level of a zonal topology that represents the multiple zones. In some embodiments, a strength of a level in a zonal topology may be considered a measurement of the number of resource locations available for scheduling in a level of the zonal topology. The method, process steps, or stages illustrated in the figures may be implemented as an independent routine or process, or as part of a larger routine or process. Note that each process step or stage depicted may be implemented as an apparatus that includes a processor executing a set of instructions, a method, or a system, among other embodiments. In some embodiments, the level-strength-based scheduling method 400 is described with reference to the figures FIG. 1-FIG. 5C. Examples of the use of the level-strength-based scheduling method of FIG. 4 are illustrated in FIG. 5B and FIG. 5C.

In some embodiments, at operation 402, the zonal topology core 330 of level-strength-based scheduler 253 receives a resource request from a user of the system 100. In some embodiments, the resource request may be a resource addition request (e.g., a request to add a pod or pods to a cluster or clusters across multiple zones or a request to upgrade a number of replicas of pods to a cluster or clusters across multiple zones) or a resource deletion request (e.g., a request to delete a pod or pods from a cluster or clusters across multiple zones or a request to downgrade a number of replicas of pods from a cluster or clusters across multiple zones) from a user of system 100. In some embodiments, a resource may be, for example, a pod or a replica of a pod. In some embodiments, zonal topology core 330 receives the resource request by monitoring the configure store 258 of the container orchestration engine control unit 140 for resource requests. In some embodiments, for example, the user of system 100 may request to upgrade (e.g., add) or downgrade (e.g., delete) the number of resources in a zonal topology by a positive integer value m. In some embodiments, the resource request type and number of replicas or pods associated with the resource request type (e.g., the number of replicas to be added or deleted) may be stored by zonal topology core 330 for further use in the level-strength-based scheduling process described further herein.

In some embodiments, at operation 405, in addition to the resource request, the zonal topology core 330 ascertains zonal topology information 340 from, for example, the user of the system 100. In some embodiments, the zonal topological information 340 includes information related to the zonal topology configuration utilized to generate the zonal topology graph. In some embodiments, the zonal topology information 340 includes, for example, a list of zones, a node distribution of nodes across the zones, a number of resources (e.g., pods or replicas of pods), and a breadth strength threshold (e.g., minimum threshold zonal availability). In some embodiments, the list of zones is a list of zones that define the zonal topology that is used to qualify and assign the nodes for each different zone. In some embodiments, the zones may be, for example, a business zone, a perimeter zone, and/or a restricted zone for any given platform (e.g., a VISA® cloud view platform). In some embodiments, the node distribution is the node level distribution of the nodes across the different zones of the zonal topology configuration. In some embodiments, the number of resources is the desired number of resources (e.g., pods or replicas of pods) that are to be present in the system after scaling the resources. In some embodiments, the breadth strength threshold is a threshold value that is used distinguish the weak levels from the strong levels of the zonal topology graph. In some embodiments, the breadth strength threshold may be considered an availability measure that ensures that the desired percentage of resources is spanned across different zones. In some embodiments, the zonal topology information 340 is ascertained by the zonal topology core 330 from the user of the container orchestration engine control unit 140.

In some embodiments, at operation 410, zonal topology graph generator 350 utilizes the zonal topology information 340 to generate or construct a zonal topology graph. In some embodiments, the zonal topology graph generator 350 is configured to utilize zonal topology information 340 to form an acyclic graph that reflects the exact topology that is represented in the clusters of the zones. In some embodiments, a makeGraph function in a programming language, such as, for example, the GoLang programming language, may be utilized to generate the zonal topology graph with the zonal topology information 340 as input to the makeGraph function.

In some embodiments, at operation 412, level-by-level breadth analyzer 351 performs a level-by-level breadth analysis of the zonal topology graph for each level of the zonal topology. In some embodiments, the level-by-level breadth analyzer 351 performs a level-by-level breadth analysis by computing a level-by-level breadth value for each of the levels of the zonal topology graph that represents the state of the zonal distribution of the resources (e.g., pods or replicas) before processing or scheduling occurs. In some embodiments, the results of the level-by-level breath analysis are stored in a hashmap with the level as a key and the breadth of the level as the level-by-level breadth value.

In some embodiments, at operation 415, zonal level strength assessment unit 360 of validator engine 320 determines whether the level strength of each level of the zonal topology graph is a weak level or a strong level. In some embodiments, the zonal level strength assessment unit 360 determines whether the level strength of each level of the zonal topology graph is a weak level or a strong level by comparing the level-by-level breadth value generated by level-by-level breadth analyzer 351 to a breadth strength threshold provided as part of zonal topology information 340. In some embodiments, the breadth strength threshold is a threshold value that is used distinguish the weak levels from the strong levels of the zonal topology by identifying weak levels of the zonal topology graph as being when there is a less than seventy-five percent (e.g., 0.75) availability of resources (e.g., pods or replicas of pods) across zones. In some embodiments, other numerical values may be used to represent the breadth strength threshold. In some embodiments, when the level-by-level breadth value is less than or equal to the breadth strength threshold, the level is identified as a weak level by zonal level strength assessment unit 360 and marked as such by zonal strength recordation unit 352 at operation 430. In some embodiments, when the level-by-level breadth value is greater than the breadth strength threshold, the level is identified as a strong level by zonal level strength assessment unit 360 and marked as such by zonal strength recordation unit 352 at operation 420.

In some embodiments, at operation 425, after the zonal topology graph has been constructed and the weak levels of the zonal topology graph have been identified and marked as weak levels, Euclidean distance sum generation unit 353 computes the minimum Euclidean distance sum using the zonal topology graph and the identified strength levels. In some embodiments, in order to compute the minimum Euclidean distance sum, the Euclidean distance sum generation unit 353 determines the Euclidean distance by computing the centroid of all the points of the zonal topology graph and calculating the Euclidean distance of the point that represents a resource (e.g., pod or replica) in the weak level and the centroid point using the formula $$d = \sqrt{(x_2-x_1)^2 + (y_2-y_1)^2}$$

where $(x_1, y_1)$ represents a resource (e.g., pod or replica) in the weak level and $(x_1, y_1)$ represents the centroid of all points in the zonal topology graph. In some embodiments, after calculating the distances for each of the resources of the zonal topology graph, the minimum Euclidean distance sum is calculated by calculating the sum of all distances and dividing the result by the total number of resources in the weak levels.

In some embodiments, after the minimum Euclidean distance sum has been calculated by the Euclidean distance sum generation unit 353 or the level has been marked as a strong level by zonal strength recordation unit 352, at operation 435, the resource request assessment unit 311 of validator engine 320 determines whether the request type for the level-strength-based scheduling is a resource addition request type or a resource deletion request type. In some embodiments, the resource request assessment unit 311 determines whether the request type for the level-strength-based scheduling is a resource addition request type or a resource deletion request type by assessing the resource request received at operation 402. In some embodiments, for a resource addition request type, the resources that are to be added to a level of the zonal topology may be referred to as "pods-to-be-added" or "replicas-to-be-added" or "resources-to-be added". In some embodiments, for a resource deletion request type, the resources to be deleted may be referred to as "pods-to-be-deleted" or "replicas-to-be-deleted" or "resources-to-be-deleted".

In some embodiments, at operation 467, when the resource request assessment unit 311 determines that the resource request type is a resource addition request type, the strength level determination unit 312 of validator engine 320 determines whether any levels in the zonal topology graph have been identified and marked as weak levels. In some embodiments, when strength level determination unit 312 determines that levels in the zonal topology graph have been identified and marked as weak levels, at operation 470, zonal scaling unit 370 of zonal topology core 330 adds the pods-to-be-added to the weak levels (starting from, for example, level 0 to level n, where n is the depth of the zonal topology graph) until the weak levels have been filled with the pods-to-added and the number of pods-to-be-added have been exhausted, or until all the weak levels have been filled and there are no more weak levels to fill with additional pods-to-be-added. It is important to note that in some instances there may be an excess of number of pods-to-be-added above the number of weak levels available to be filled by the pods-to-be-added, as described further herein with reference to operation 475.

In some embodiments, at operation 475, resource allocation unit 313 determines whether there are additional pods-to-be-added after all the weak levels of the zonal topology have been filled with the pods-to-added. In some embodiments, resource allocation unit 313 determines whether there are additional pods-to-be-added by determining whether a number of target resources (e.g., pods or replicas) is less than a result set size. In some embodiments, a result set may be, for example, a set of the resources (e.g., pods or replicas) that have been collected (e.g., added or deleted) from a level of the zonal topology and a result set size is the size of the result set. In some embodiments, a number of target resources may be, for example, the number of target resources requested by the user.

In some embodiments, at operation 480, when there are no weak levels at operation 467 or all the weak levels are filled with pods and there are additional pods-to-be-added at operation 475, zonal scaling unit 370 creates a new level in the zonal topology for placement of the additional pods-to-be-added. In some embodiments, the size of the newly created level generated by the zonal scaling unit 370 is equivalent to the size of the other levels in the zonal topology. In some embodiments, after a new level has been created by zonal scaling unit 370, zonal scaling unit 370 fills the newly created level with the additional pods-to-be added until all the pods-to-be-added have been added to the newly created level. In some embodiments, if the newly created level is completely filled with the additional pods-to-be-added and there are additional pods-to-be-added, zonal scaling unit 370 continues to create levels until all the additional pods-to-be added have been placed in a newly created level. In some embodiments, after all the pods-to-be-added have been added to the newly created level at operation 485, operation 485 proceeds to the end operation 495.

In some embodiments, with further reference to operation 435, when the resource request type is a resource deletion request type, at operation 440, the strength level determination unit 312 of validator engine 320 determines whether any levels in the zonal topology graph have been identified and marked as weak levels. In some embodiments, when strength level determination unit 312 determines that levels in the zonal topology graph have been identified and marked as weak levels, at operation 445, zonal scaling unit 370 of zonal topology core 330 deletes the pods-to-be-deleted from the weak levels first (e.g., starting with weak levels from level 0 to level n, where n is the depth of the zonal topology graph) until there are no more pods-to-be-deleted from the weak levels or there are no more weak levels to delete pods-to-be-deleted from. In some embodiments, zonal scaling unit 370 selects the pods-to-be-deleted from the corresponding weak level by using, for example, a breadth-first-search (BFS) algorithm. In some embodiments, the result of the BFS may be added to a result set for further use during level-strength-based scheduling.

In some embodiments, at operation 450, after zonal scaling unit 370 has deleted pods-to-be-deleted from the weak levels first at operation 445, resource allocation unit 313 determines whether there are additional pods-to-be-deleted. In some embodiments, resource allocation unit 313 determines whether there are additional pods-to-be-deleted by determining whether a result set size subtracted from a total number of resources (e.g., replicas or pods) is less than a target number of resources (e.g., replicas or pods). In some embodiments, when the result set size subtracted from a total number of resources (e.g., replicas or pods) is not less than a target number of resources (e.g., replicas or pods), there are not additional pods-to-be-deleted from the zonal topology and operation 450 proceeds to end operation 495.

In some embodiments, when resource allocation unit 313 determines that there are additional-pods-to-be-deleted at operation 450 or when strength level determination unit 312 determines that levels in the zonal topology graph have not been identified and marked as weak levels at operation 440, zonal scaling unit 370 deletes pods-to-be deleted from the strong levels of the zonal topology (e.g., starting with strong levels from level 0 to level n, where n is the depth of the zonal topology graph). In some embodiments, the zonal scaling unit 370 determines the location to delete the pods-to-be-deleted in the strong levels by selecting a random vertex in a strong level of the zonal topology graph and traversing the zonal topology graph (e.g., by using a depth-first-search algorithm) the minimum Euclidean distance sum ascertained at operation 425. In some embodiments, zonal scaling unit 370 then selects the pods-to-be-deleted from the corresponding strong level by using, for example, a breadth-first-search (BFS) algorithm. In some embodiments, when the selected level for resource deletion has been exhausted and there are additional pods-to-be-deleted, operation 492 may be repeated until there are no additional pods-to-be-deleted. In some embodiments, operation 492 then proceeds to end operation 495.

In some embodiments, the level-strength-based scheduling method 400 may optionally include operation 455 and operation 460. In some embodiments, with further reference to operation 450, when resource allocation unit 313 determines that there are additional pods-to-be-deleted, optionally, at operation 455, resource allocation unit 313 determines whether to continue the deletion of the additional pods-to-be-deleted from the zonal topology. In some embodiments, resource allocation unit 313 determines whether to continue the deletion of the additional pods-to-be-deleted by seeking authorization from the user of the zonal scheduling unit 250 via an email or some other form of system 100 communication (such as, for example, an email submit button or the like). In some embodiments, when resource allocation unit 313 determines that the user does not seek to continue deletion of the additional pods-to-be-deleted, operation 455 proceeds to end operation 495.

In some embodiments, when resource allocation unit 313 determines that, for example, the user of system 100 seeks to continue the deletion of the additional pods-to-be-deleted, at operation 460, resource allocation unit 313 may obtain the deletion priority of the additional pods-to-be-deleted. In some embodiments, resource allocation unit 313 obtains the deletion priority of the additional pods-to-be-deleted by asking the user of system 100 for the priority of the resource (e.g., pods or replica) availability across the zones. In some embodiments, the pods-to-be-deleted may then be deleted from the zonal topology according to the deletion priority provided by the user of system 100. In some embodiments, operation 492 then proceeds to end operation 495.

FIG. 5A illustrates an example of a zonal topology used to implement level-strength-based scheduling in accordance with some embodiments. FIG. 5B illustrates an example of level-strength-based scheduling on the zonal topology of FIG. 5A in accordance with some embodiments. FIG. 5C illustrates an example of level-strength-based scheduling on the zonal topology of FIG. 5B in accordance with some embodiments. In some embodiments, the zonal topology in FIG. 5A includes three levels (e.g., level 591, level 592, level 593) with fifteen replicas (e.g., CRDB-0-CRDB 14) across five zones (e.g., Zone A-Zone E). In some embodiments, Zone A includes Node A1-Node A3, Zone B includes Node B1-Node B3, Zone C includes Node C1-Node C3, Zone D includes Node D1-Node D3, and Zone E includes Node E1-Node E3.

In some embodiments, with reference to FIG. 5B, level-strength-based scheduler 253 received a resource addition request to upgrade (e.g., resource addition request type) the number of replicas in the zonal topology of FIG. 5A by a total number of 4 (e.g., as part of the zonal topology information). The zonal tonal topology information includes five zones, three nodes per zone, nineteen pods (e.g., replicas), and breadth strength threshold of seventy five percent (e.g., 0.75). The zonal topology graph generator 350, utilizing the zonal topology information, constructed a zonal topology graph mapping to the zonal topology of FIG. 5A and the level-by-level breadth analyzer 351 calculated the level-by-level breadth value to be 5 for each level of the zonal topology graph. Comparing the level-by-level breadth values to the breadth strength threshold, the zonal level strength assessment unit 360 determined that there are no weak levels in the zonal topology graph and the zonal strength recordation unit 352 marked all levels of the zonal topology graph as strong levels. In this case, since there are no weak levels, zonal scaling unit 370, zonal scaling unit 370 created a new level (e.g., level 594) with nodes (e.g., Node A4, Node B4, Node C4, Node D4, and Node E4) for placement of the pods-to-be-added (e.g., the four replicas CRDB-15, CRDB-16, CRDB-17, and CRBD-18) as illustrated in FIG. 5B. In the example illustrated in FIG. 5B, zonal scaling unit 370 added the pods-to-be-added to Node A4, Node B4, Node C4, and Node D4 of the newly created level 594 utilizing the level-strength-based scheduling method 400 of FIG. 4.

As stated previously, FIG. 5C illustrates an example of level-strength-based scheduling being performed on the zonal topology of FIG. 5B. In the illustration of FIG. 5C, level-strength-based scheduler 253 received a resource addition request to downgrade (e.g., resource deletion request type) the number of replicas in the zonal topology by a total number of 9. For the illustrated example, using the calculated level-by-level breadth values of the zonal topology graph generated from the zonal topology of FIG. 5B, the zonal level strength assessment unit 360 determined that level 594 is a weak level and level 591, level 593, and level 593 are strong levels. In addition, the zonal strength recordation unit 352 marked level 594 as a weak level and level 591, level 593, and level 593 as strong levels. The resource request assessment unit 311 determined that the resource request is resource deletion request type and the strength level determination unit 312 determined that level 594 has been identified and marked as a weak level. The Euclidean distance sum generation unit 353 generated a minimum Euclidean distance sum of 1 for deletion of the additional pods-to-be deleted. Using the level identified as a weak level, zonal scaling unit 370 deleted pods with ordinals 15, 16, 17, and 18 (e.g., CRDB-15, CRDB-16, CRDB-17, and CRDB-18) from level 594. After having deleted the pods with ordinals 15, 16, 17, and 18 from level 594, resource allocation unit 313 determined that there are 5 additional pods-to-be-deleted. Zonal scaling unit 370 selected node D1 as the random vertex and traveled to a Euclidean distance of 1. which is node D2, and deleted the 5 additional pods-to-be-deleted from level 592.

In some embodiments, utilizing the level-strength-based scheduling method described herein, ensures that the resource deletion and resource addition is non-deterministic while maintaining the high availability of resources across the plurality of zones.

In some embodiments, a result set may be approved by zonal scheduling unit 250. In some embodiments, in approving a result set, zonal scaling unit 370 determines whether the size of the result set subtracted from the total number of pods is greater than or equals to the number of zones. In some embodiments, when the size of the result set subtracted from the total number of pods is not greater than or equal to the number of zones, an email may be triggered to the user of system 100 asking if the resource deletion request or the resource addition request shall proceed and asking for the zone priority of the pods availability across the zones. In some embodiments, when the user or system 100 approves the request, the resources (e.g., pods-to-be-deleted) are deleted from least prioritized zones first and further ascending to the most prioritized zones.

In some embodiments, instead of performing a deletion operation at operation 445 or operation 492, or an addition operation at operation 470 and operation 485, zonal scheduling unit 250 may mark the resources for deletion (or addition) and delete (or add) the resources at a later instance, such as, for example, when a user of the system 100 approves the deletion or addition operation.

In some embodiments, by utilizing zonal scheduling unit 250, the level-strength-based scheduler 253 is a custom, non-deterministic scheduler. In some embodiments, as stated previously, the level-strength-based scheduler 253 may be utilized as a custom scheduler plugin that may be compiled into a scheduling framework of the container orchestration engine, such as, for example, the Kubernetes® pluggable scheduler framework. In some embodiments, the custom scheduler plugin may be compiled into the Kubernetes pluggable scheduler framework while keeping the scheduling core lightweight and maintainable.

In some embodiments, the validator engine 320 may be bundled with the custom scheduler plugin to eliminate any corner scenarios for unapproved pod downscaling or cancelling the zonal availability for an application. In some embodiments, the zonal scheduling unit 250 includes Golangci lint engine that can help run the linters in parallel, uses caching and supports yaml configurations. In some embodiments, the zonal Topology core 330 may take an original distribution of a statefulset across nodes and zones and determine the ordinal to zone mapping.

In some embodiments, the zonal scheduling unit 250 is configured to fetch the targeted number of replicas and construct a zonal topology to maintain the order of deletion of the pods to achieve seamless downscaling of the resources without hampering the high availability of the same. In some embodiments, for both resource request types, a random point may be selected in the zonal topology graph.

In some embodiments, the zonal scheduling unit 250 may run on any OS, but the zonal scheduling unit 250 may be compiled against the custom scheduling plugin offered by, for example, Kubernetes®. In some embodiments, zonal scheduling unit 250 may be built as an addon that can be run as a scheduler in other container orchestration engines.

In some embodiments, as described herein, the level-strength-based scheduling method 400 utilized in zonal scheduling unit 250 improves upon computing efficiency and data storage in that, for example, the level-strength-based scheduling method 400 can automatically upscale or downscale applications seamlessly. In some embodiments, technical benefits related to the improvement of computing technology include, for example, the upscaling or downscaling process being non-deterministic such that a pattern cannot be replicated or reproduced. In addition, in some embodiments, the process ensures fault tolerance is achieved while the resources are scaled downwards or upwards. In some embodiments, utilization of the level-strength-based scheduling method 400 ensures consensus remains between the components placed across a distributed system while the resources are scaled downwards or upwards. In some embodiments, utilization of the level-strength-based scheduling method 400 ensures availability of replicas across each of operability zones. In some embodiments, utilization of the level-strength-based scheduler 253 enhances the autoscaling process speed whilst maintaining the high availability across zones and non-deterministic behaviour. In some embodiments, the level-strength-based scheduler 253 may be integrated with container orchestration engines including, for example, openshift, hashicorp, and the like. In some embodiments, the framework provided by zonal scheduling unit 250 can automatically and seamlessly schedule pods (or any singular containerized resource) in a non-deterministic manner thereby ensuring the high availability across multiple zones and operating efficiency.

In some embodiments, a method includes receiving zonal topology information related to a zonal topology of a plurality of zones; utilizing the zonal topology information to perform a level strength assessment of each level of a plurality of levels associated with the zonal topology of the plurality of zones; and based on the level strength assessment of each level of the plurality of levels, scaling a target number of resources to at least a first level of the plurality of levels of the zonal topology.

In some embodiments of the method, the level strength assessment includes performing a level-by-level breadth analysis of each level of the plurality of levels of the zonal topology.

In some embodiments of the method, the level strength assessment includes determining whether a level-by-level breadth value computed during the level-by-level breadth analysis is less than or equal to a breadth strength threshold.

In some embodiments of the method, when the level-by-level breadth value is less than or equal to the breadth strength threshold, the level associated with the level-by-level breadth value is designated as a weak level and when the level-by-level breadth value is greater than the breadth strength threshold, the level associated with the level-by-level breadth value is designated as a strong level.

In some embodiments, the method further includes using a minimum sum of a Euclidean distance in the scaling of the target number of resources.

In some embodiments, the method further includes, when a request type is an addition-type scaling and at least a first weak level is available for the addition-type scaling, adding resources-to-be-added to at least the first weak level of the zonal topology.

In some embodiments, the method further includes, when all available weak levels have been filled with the resources-to-be-added and there are additional resources-to-be added to the zonal topology, creating at least a first new level to fill with the additional resources-to-be added to the zonal topology.

In some embodiments, the method further includes, when a request type is an addition-type scaling and at least a first weak level is not available for addition-type scaling, creating at least a first new level to fill with the resources-to-be-added.

In some embodiments, the method further includes, when a request type is a deletion-type scaling and at least a first weak level is available for the deletion-type scaling, deleting resources-to-be-deleted from all the weak levels of the zonal topology prior to deleting the resources-to-be-deleted from a first strong level of the zonal topology.

In some embodiments, the method further includes, when a request type is a deletion-type scaling and at least a first weak level is not available for the deletion-type scaling, deleting resources-to-be-deleted from at least a first strong level of the zonal topology.

In some embodiments, a system includes a processor; and a non-transitory computer readable medium coupled to the processor, the non-transitory computer readable medium comprising code that: receives zonal topology information related to a zonal topology of a plurality of zones; utilizes the zonal topology information to perform a level strength assessment of each level of a plurality of levels associated with the zonal topology of the plurality of zones; and scales a target number of resources to at least a first level of the plurality of levels of the zonal topology based on the level strength assessment.

In some embodiments of the system, the non-transitory computer readable medium further comprises code that, determines whether a level-by-level breadth value computed during a level-by-level breadth analysis is less than or equal to a breadth strength threshold.

In some embodiments of the system, the non-transitory computer readable medium further comprises code that, when the level-by-level breadth value is less than or equal to the breadth strength threshold, designates the level associated with the level-by-level breadth value as a weak level and when the level-by-level breadth value is greater than the breadth strength threshold, designates the level associated with the level-by-level breadth value as a strong level.

In some embodiments of the system, the non-transitory computer readable medium further comprises code that, when a request type is an addition-type scaling and at least a first weak level is available for the addition-type scaling, adds resources-to-be-added to at least the first weak level of the zonal topology.

In some embodiments of the system, the non-transitory computer readable medium further comprises code that, when a request type is an addition-type scaling and at least a first weak level is not available for addition-type scaling, generates at least a first new level in the zonal topology to fill with resources-to-be-added to the zonal topology.

In some embodiments of the system, the non-transitory computer readable medium further comprises code that, when a request type is a deletion-type scaling and at least a first weak level is available for the deletion-type scaling, deletes resources-to-be-deleted from all weak levels of the zonal topology prior to deleting the resources-to-be-deleted from at least a first strong level of the zonal topology.

In some embodiments, an apparatus includes a zonal topology graph generator; a zonal level strength assessment unit coupled to the zonal topology graph generator; a zonal scaling unit coupled to the zonal level strength assessment unit and zonal topology graph generator, wherein, based on an assessment of level strengths associated with a zonal topology, the zonal scaling unit scales resources from the zonal topology using a zonal topology graph generated by the zonal topology graph generator.

In some embodiments of the apparatus, when at least a first weak level identified by the zonal level strength assessment unit is available for scaling in the zonal topology, the zonal scaling unit scales resources using all available weak levels prior to scaling resources using strong levels identified by the zonal level strength assessment unit.

In some embodiments of the apparatus, when the scaling of resources is an addition type scaling and there are no weak levels available for scaling, the zonal scaling unit creates a new level in the zonal topology to scale the resources.

In some embodiments of the apparatus, when the scaling of resources is a deletion type scaling, the zonal scaling unit deletes the resources from the weak levels of the zonal topology before deleting resources from the strong levels of the zonal topology.

What is claimed is:

1. A method, comprising:
receiving a resource request;
receiving zonal topology information including a list of a plurality of server zones, a distribution of nodes across the server zones, a number of resources, and a minimum threshold resource availability across the server zones, wherein:
   a zonal topology graph of a zonal topology of a plurality of resources in the distribution of nodes includes the plurality of server zones and a plurality of levels of the nodes,
   the zonal topology graph is based on the zonal topology information, and
   a level strength value for each level of a plurality of levels indicates a number of resources available for scheduling in a level; and
non-deterministically deleting resources from or adding resources to the zonal topology based on a type of the received resource request.

2. The method of claim 1, further comprising:
storing, for each of the plurality of levels, a breadth value representing a state of the distribution of nodes across the server zones.

3. The method of claim 2, wherein for each of the plurality of levels:
   when the breadth value is less than or equal to the minimum threshold resource availability across the server zones, the level associated with the breadth value is a weak level, and
   when the breadth value is greater than the minimum threshold resource availability across the server zones, the level associated with the breadth value is a strong level.

4. The method of claim 3, wherein non-deterministically deleting resources from or adding resources to the zonal topology is further based on a minimum sum of a Euclidean distance associated with the zonal topology graph.

5. The method of claim 4, further comprising:
when the type of the received request is an addition-type scaling and at least a first weak level is available for the addition-type scaling, adding resources to at least the first weak level of the zonal topology.

6. The method of claim 5, further comprising:
when all available weak levels have been filled with resources and there are additional resources to be added to the zonal topology, creating at least a first new level in the zonal topology to fill with the additional resources.

7. The method of claim 4, further comprising:
when the type of the received request is an addition-type scaling and at least a first weak level is not available for the addition-type scaling, creating at least a first new level to fill with resources.

8. The method of claim 4, further comprising:
when the type of the received request is a deletion-type scaling and at least a first weak level is available for the deletion-type scaling, deleting resources from all the weak levels of the zonal topology prior to deleting resources from a first strong level of the zonal topology.

9. The method of claim 4, further comprising:
when the type of the received request is a deletion-type scaling and at least a first weak level is not available for the deletion-type scaling, deleting resources from at least a first strong level of the zonal topology.

10. A system, comprising:
a processor; and
a non-transitory computer readable medium coupled to the processor, the non-transitory computer readable medium comprising code that:
   receives a resource request;
   receives zonal topology information including a list of a plurality of server zones, a distribution of nodes across the server zones, a number of resources, and a minimum threshold resource availability across the server zones, wherein:
      a zonal topology graph of a zonal topology of a plurality of resources in the distribution of nodes includes the plurality of server zones and a plurality of levels of the nodes,
      the zonal topology graph is based on the zonal topology information, and
      a level strength value for each level of a plurality of levels indicates a number of resources available for scheduling in a level; and
   non-deterministically deletes resources from or adds resources to the zonal topology based on a type of the received resource request.

11. The system of claim 10, wherein for each of the plurality of levels: the non-transitory computer readable medium further comprises code that,
   when the breadth value is less than or equal to the minimum threshold resource availability across the server zones, the level associated with the breadth value is a weak level, and
   when the breadth value is greater than the minimum threshold resource availability across the server zones, the level associated with the breadth value is a strong level.

12. The system of claim 11, wherein: the non-transitory computer readable medium further comprises code that,
   when the type of the received request is an addition-type scaling and at least a first weak level is available for the addition-type scaling, adds resources to at least the first weak level of the zonal topology.

13. The system of claim 11, wherein: the non-transitory computer readable medium further comprises code that,
   when the type of the received request is an addition-type scaling and at least a first weak level is not available for the addition-type scaling, generates at least a first new level in the zonal topology to fill with resources.

14. The system of claim 11, wherein: the non-transitory computer readable medium further comprises code that, when the type of the received request is a deletion-type scaling and at least a first weak level is available for the deletion-type scaling, deletes resources from all weak levels of the zonal topology prior to deleting resources from at least a first strong level of the zonal topology.

15. An apparatus, comprising:

a processor; and a non-transitory computer readable medium coupled to the processor, the non-transitory computer readable medium comprising code that is utilized as:

a zonal topology graph generator;

a zonal level strength assessment unit coupled to the zonal topology graph generator; and a zonal scaling unit coupled to the zonal level strength assessment unit and zonal topology graph generator, wherein the code when executed by the processor further causes the apparatus to:

receive a resource request;

receive zonal topology information including a list of a plurality of server zones, a distribution of nodes across the server zones, a number of resources, and a minimum threshold resource availability across the server zones, wherein:

a zonal topology graph of a zonal topology of a plurality of resources in the distribution of nodes includes the plurality of server zones and a plurality of levels of the nodes, the zonal topology graph is based on the zonal topology information, and a level strength value for each level of a plurality of levels indicates a number of resources available for scheduling in a level; and non-deterministically delete resources from or add resources to the zonal topology based on a type of the received resource request.

16. The apparatus of claim 15, wherein:

when at least a first weak level is available for scaling in the zonal topology, the zonal scaling unit scales resources using all available weak levels prior to scaling resources using strong levels.

17. The apparatus of claim 16, wherein:

when the scaling of resources is an addition type scaling and there are no weak levels available for scaling, the zonal scaling unit creates a new level in the zonal topology to scale the resources.

18. The apparatus of claim 16, wherein:

when the scaling of resources is a deletion type scaling, the zonal scaling unit deletes the resources from the weak levels of the zonal topology before deleting resources from the strong levels of the zonal topology.

19. The apparatus of claim 15, wherein the apparatus further comprises a zonal strength recordation unit.

20. The apparatus of claim 19, wherein the apparatus further comprises a zonal topology core including the zonal topology graph generator, the zonal strength recordation unit, and the zonal scaling unit.

\* \* \* \* \*